(12) United States Patent
Nimmagadda et al.

(10) Patent No.: US 12,388,702 B2
(45) Date of Patent: Aug. 12, 2025

(54) FLEET MANAGEMENT ADAPTERS FOR DATA COLLECTION AGENTS

(71) Applicant: Cisco Technology, Inc., San Jose, CA (US)

(72) Inventors: Pavan Krishna Nimmagadda, Milpitas, CA (US); Phani Krishna Devavarapu, Chandler, AZ (US); Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/422,385

(22) Filed: Jan. 25, 2024

(65) Prior Publication Data

US 2025/0062949 A1    Feb. 20, 2025

Related U.S. Application Data

(60) Provisional application No. 63/533,020, filed on Aug. 16, 2023.

(51) Int. Cl.
*H04L 41/046* (2022.01)
*H04L 41/084* (2022.01)

(52) U.S. Cl.
CPC ........ *H04L 41/046* (2013.01); *H04L 41/0843* (2013.01)

(58) Field of Classification Search
CPC ............... H04L 41/046; H04L 41/0843
See application file for complete search history.

(56) References Cited

U.S. PATENT DOCUMENTS

| | | |
|---|---|---|
| 2017/0351988 A1 | 12/2017 | Pirkle et al. |
| 2019/0026716 A1* | 1/2019 | Anbukkarasu ....... G06Q 20/308 |
| 2020/0067789 A1 | 2/2020 | Khuti et al. |
| 2021/0297508 A1 | 9/2021 | Sambandan et al. |
| 2022/0107744 A1* | 4/2022 | Capelo ................... G06N 20/00 |
| 2023/0136061 A1* | 5/2023 | Hung .................. H04L 41/0806 709/222 |

FOREIGN PATENT DOCUMENTS

WO    2023014940 A1    2/2023

OTHER PUBLICATIONS

OPENTELEMETRY: "Open Agent Management Protocol", retrieved on Jul. 26, 2023, 45 Pages.

* cited by examiner

*Primary Examiner* — Minh Chau Nguyen
(74) *Attorney, Agent, or Firm* — Behmke Innovation Group LLC; James M. Behmke

(57) ABSTRACT

In one embodiment, a method herein comprises: registering, by an orchestration service agent, with a central management device to receive a corresponding configuration for the orchestration service agent, wherein the central management device receives a registration from each of a plurality of orchestration service agents; self-configuring, by the orchestration service agent, based on the corresponding configuration; obtaining, by the orchestration service agent and from the central management device, an observability-agent-specific configuration package; and configuring, by the orchestration service agent and based on the observability-agent-specific configuration package, a corresponding observability agent associated with the orchestration service agent and executing on a corresponding entity.

20 Claims, 12 Drawing Sheets

Packages Available

Figure 1:
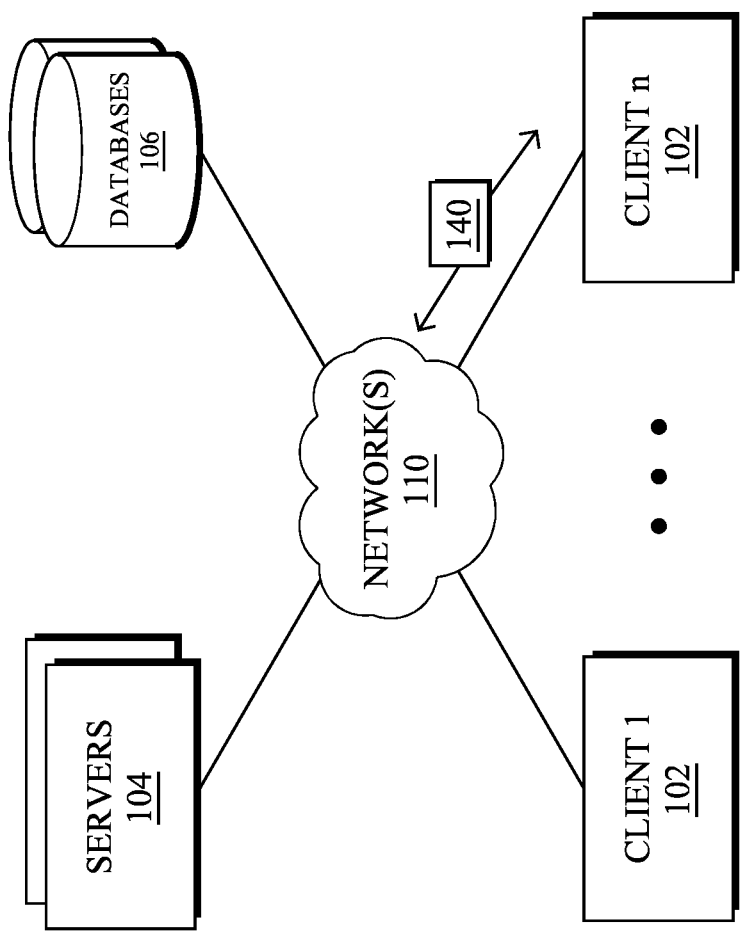

```
message PackagesAvailable {
    packages: {
        "java-agent-uid1": {
            PackageType type = Add-On;
            string version = 1; # set this to version of the deployment script not agent version (that is set inside the deployment script)
            DownloadableFile file = {
                string download_url = "https://fm-service/deployments?deployment_id=java-agent-id1"
                bytes content_hash = 3dasdasdsdasdas;
                bytes signature = 3;
            }
            bytes hash = 4;
        }
        "java-agent-uid2": {
            PackageType type = Add-On;
            string version = 2
            DownloadableFile file = {
                string download_url = "https://fm-service/deployments?deployment_id=java-agent-uid2"
                bytes content_hash = 5dasdsadasddsa;
                bytes signature = 3;
            }
            bytes hash = 4;
        }
    }
    bytes all_packages_hash = 2;
}
```

FIG. 5

Package Status

```
message PackageStatuses {
    packages = {
        "java-agent-uid1": {
            string name = java-agent-uid1;
            string agent_has_version = 1;
            bytes agent_has_hash = 3dasdasdsdsdasdas;
            string server_offered_version = 1;
            bytes server_offered_hash = 3dasdasdsdasdas;
            PackageStatusEnum status = PackageStatusEnum_Installed;
            string error_message = {
                "app-name": app1
                "tier-name": tier1
            };
        };
        "java-agent-uid2": {
            string name = java-agent-uid2;
            string agent_has_version = 1;
            bytes agent_has_hash = 5dasdsadasddsa;
            string server_offered_version = 1;
            bytes server_offered_hash = 5dasdsadasddsa;
            PackageStatusEnum status = PackageStatusEnum_Installed;
            // Status message if the no errors, if errors, error message
            string error_message = {
                "app-name": app1
                "tier-name": tier2
            };
        };
    }
    bytes server_provided_all_packages_hash = 2;
    # aggregate errors are recorded here, e.g connection issues
    string error_message = 3;
}
```

FIG. 6

Deployment File Schema

```
$ curl GET https://<fm-service>/v1/deployments?id=java-agent-uid1&&version=1 schema: schemas/deployments/v1
id: java-agent-uid1,
orchestration: ansible, # can be ansible|helm etc...

# deployment base templates.
templates: [{
  name: appdynamics.agents
  repo: https://galaxy.ansible.com
  min_version: 23.4.0
  max_version: 23.7.0
}]

# values.yaml for helm | play.yml for ansible.
content:
  content-type: application/x-yaml
  body:
    '''- name: Install JavaAgent
      tasks:
        - ansible.builtin.include_role:
            name: appdynamics.agents.java
          vars:
            # Define Agent Type and Version
            agent_version: 22.6.0
            agent_type: sun-java
            agent_action: install
            app-name:
            tier-name:
            node-name:
    '''
```

FIG. 7

```
apiVersion: apps/v1
kind: Deployment
metadata:
  name: zaqar
  namespace: default
  labels:
    app: zaqar
    version: v1.0.0
    env: production
spec:
  replicas: 1
  selector:
    matchLabels:
      app: zaqar
      env: production
  template:
    metadata:
      labels:
        app: zaqar
        version: v1.0.0
        env: production
    spec:
      containers:
        - name: zaqar
          image: "khaosdoctor/zaqar:v1.0.0"
          imagePullPolicy: IfNotPresent
          env:
            - name: SENDGRID_APIKEY
              value: "MY_SECRET_KEY"
            - name: DEFAULT_FROM_ADDRESS
              value: "my@email.com"
            - name: DEFAULT_FROM_NAME
              value: "Lucas Santos"
          ports:
            - name: http
              containerPort: 3000
              protocol: TCP
          resources:
            requests:
              cpu: 100m
              memory: 128Mi
            limits:
              cpu: 250m
              memory: 256Mi
```

FIG. 8

```
apiVersion: apps/v1
kind: Deployment
metadata:
  name: zaqar
  namespace: default
  labels:
    app: zaqar
    version: #!VERSION!#
    env: #!ENV!#
spec:
  replicas: 1
  selector:
    matchLabels:
      app: zaqar
      env: #!ENV!#
  template:
    metadata:
      labels:
        app: zaqar
        version: #!VERSION!#
        env: #!ENV!#
    spec:
      containers:
        - name: zaqar
          image: "khaosdoctor/zaqar:#!VERSION!#"
          imagePullPolicy: IfNotPresent
          env:
            - name: SENDGRID_APIKEY
              value: "#!SENDGRID_KEY!#"
            - name: DEFAULT_FROM_ADDRESS
              value: "#!FROM_ADDR!#"
            - name: DEFAULT_FROM_NAME
              value: "#!FROM_NAME!#"
          ports:
            - name: http
              containerPort: 3000
              protocol: TCP
          resources:
            requests:
              cpu: 100m
              memory: 128Mi
            limits:
              cpu: 250m
              memory: 256Mi
```

FIG. 9

```
apiVersion: apps/v1
kind: Deployment
metadata:
   name: {{ .Values.name }}
   namespace: {{ default .Release.Namespace .Values.namespace }}
   labels:
      app: {{ .Values.name }}
      version: {{ .Values.image.tag }}
      env: {{ .Values.env }}
spec:
   replicas: {{ .Values.replicaCount }}
   selector:
      matchLabels:
         app: {{ .Values.name }}
         env: {{ .Values.env }}
   template:
      metadata:
         labels:
            app: {{ .Values.name }}
            version: {{ .Values.image.tag }}
            env: {{ .Values.env }}
      spec:
         containers:
            - name: {{ .Chart.Name }}
              image: "khaosdoctor/zaqar:{{ .Values.image.tag }}"
              imagePullPolicy: {{ .Values.image.pullPolicy }}
              env:
                  name: SENDGRID_APIKEY
                  value: {{ required "You must set a valid Sendgrid API key" .Values.environment.
                          SENDGRID_APIKEY |
quote }}
                  name: DEFAULT_FROM_ADDRESS
                  value: {{ required "You must set a default from address" .Values.environment.
                          DEFAULT_FROM_ADDRESS |
quote }}
                  name: DEFAULT_FROM_NAME
                  value: {{ required "You must set a default from name" .Values.environment.
                          DEFAULT_FROM_NAME | quote }
}
              ports:
                  name: http
                  containerPort: 3000
                  protocol: TCP
              resources:
                  {{ toYaml .Values.resources | nindent 12 }}
```

FIG. 10

FLEET MANAGEMENT ADAPTERS FOR DATA COLLECTION AGENTS

RELATED APPLICATION

This application claims priority to U.S. Prov. Appl. Ser. No. 63/533,020, filed Aug. 16, 2023, entitled FLEET MANAGEMENT ADAPTERS FOR DATA COLLECTION AGENTS, by Nimmagadda, et al., the contents of which are incorporated herein by reference.

TECHNICAL FIELD

The present disclosure relates generally to computer systems, and, more particularly, to fleet management adapters for data collection agents.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, observability for applications and networks is largely contingent on the deployment of a fleet of monitoring agents. Traditionally, these monitoring agents have largely been proprietary, making it very difficult to garner a unified view of the system. However, with the recent promulgation of the OpenTelemetry (OTEL) standard, which seeks to unify telemetry data in a vendor-agnostic manner, it now becomes possible to better construct such unified views.

Accompanying these new opportunities to deploy multi-vendor agents to monitor a single system, however, is also the challenge of managing the fleet of agents in a unified manner. Indeed, each vendor today may use its own management approach for its own agent. To address this, the Open Agent Management Protocol (OpAMP) has emerged, which is a network protocol for the remote management of a large fleet of data collection agents. Today, OpAMP supports functions such as the remote configuration of agents, status reporting, agent specific metrics, auto-updating, and the like.

Part of a good fleet management strategy entails using OpAMP as a delivery mechanism into a cloud native application leveraging OTEL, but ultimately using proven and flexible configuration and deployment tools locally to actually manage the process. However, adapters for OpAMP to do so are not available today to use these tools.

BRIEF DESCRIPTION OF THE DRA WINGS

Figure 2:
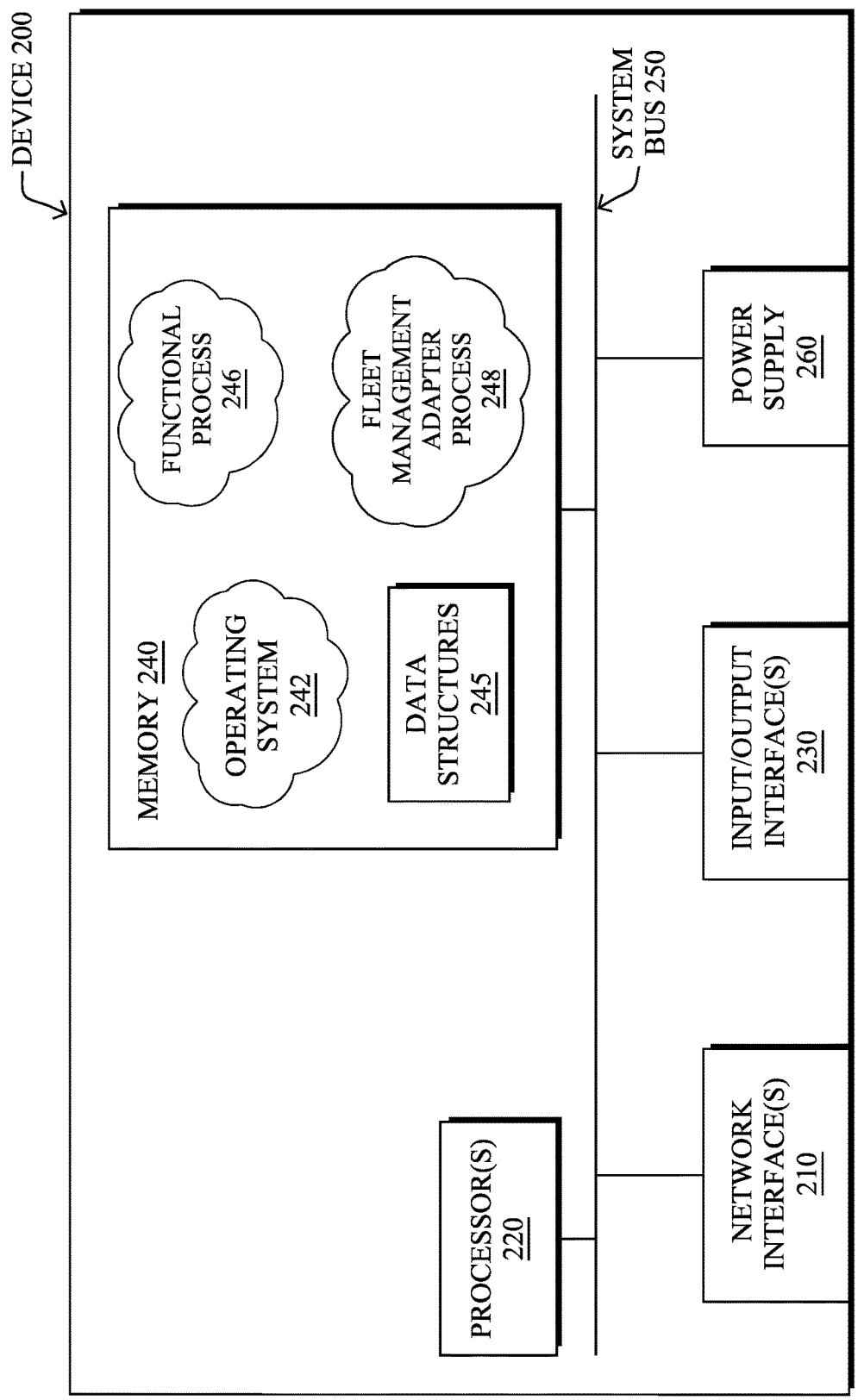
Figure 3:
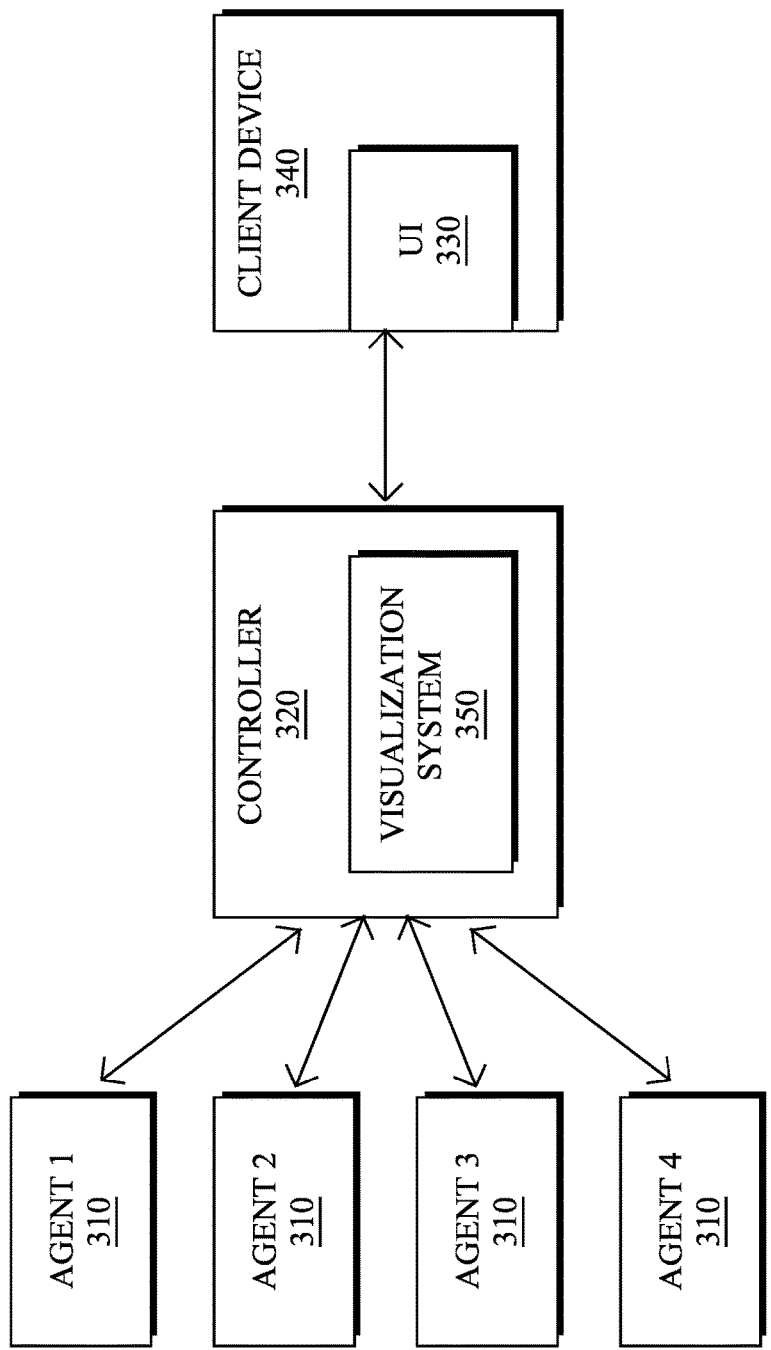
Figure 4:
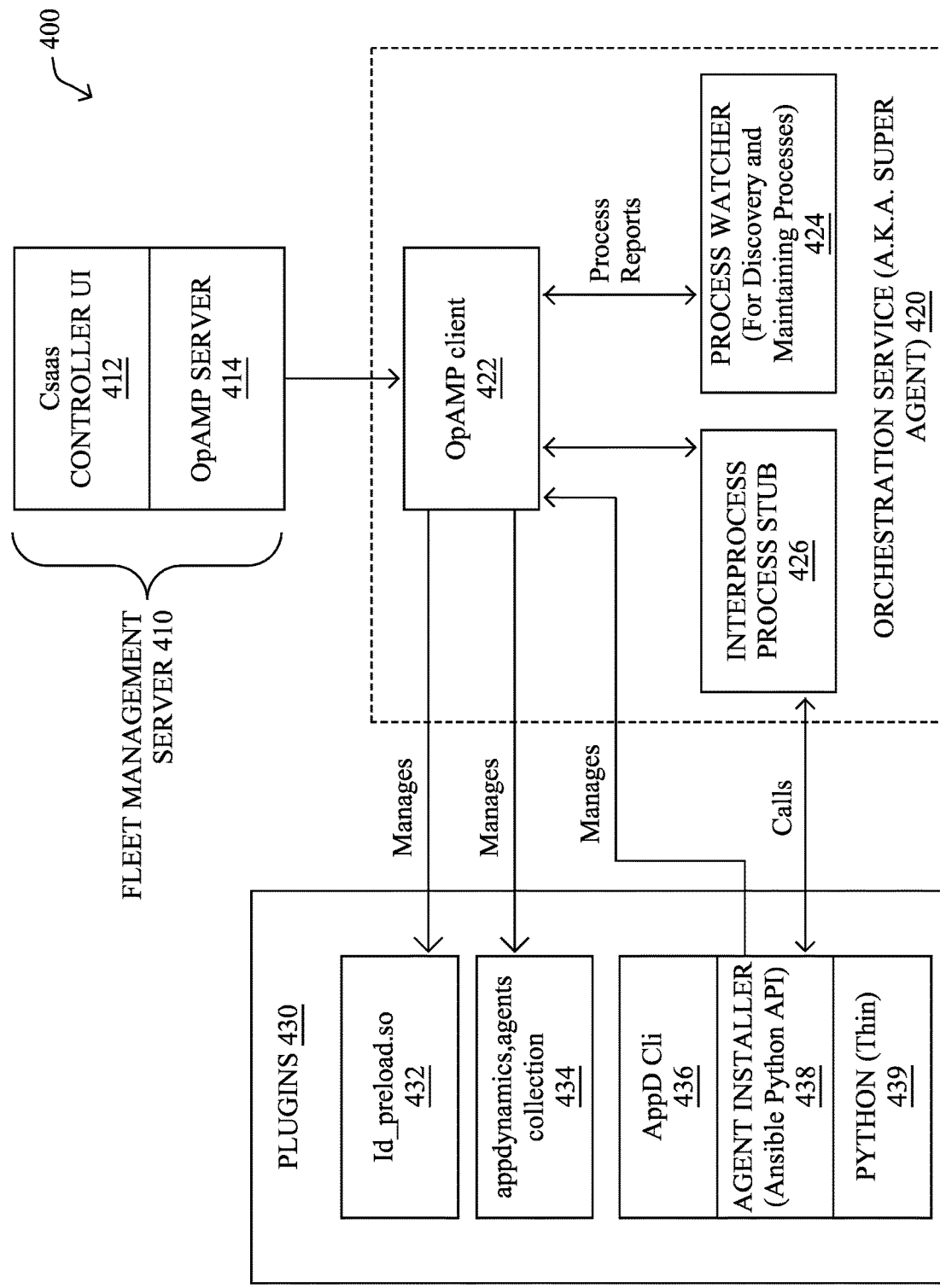
Figure 11:
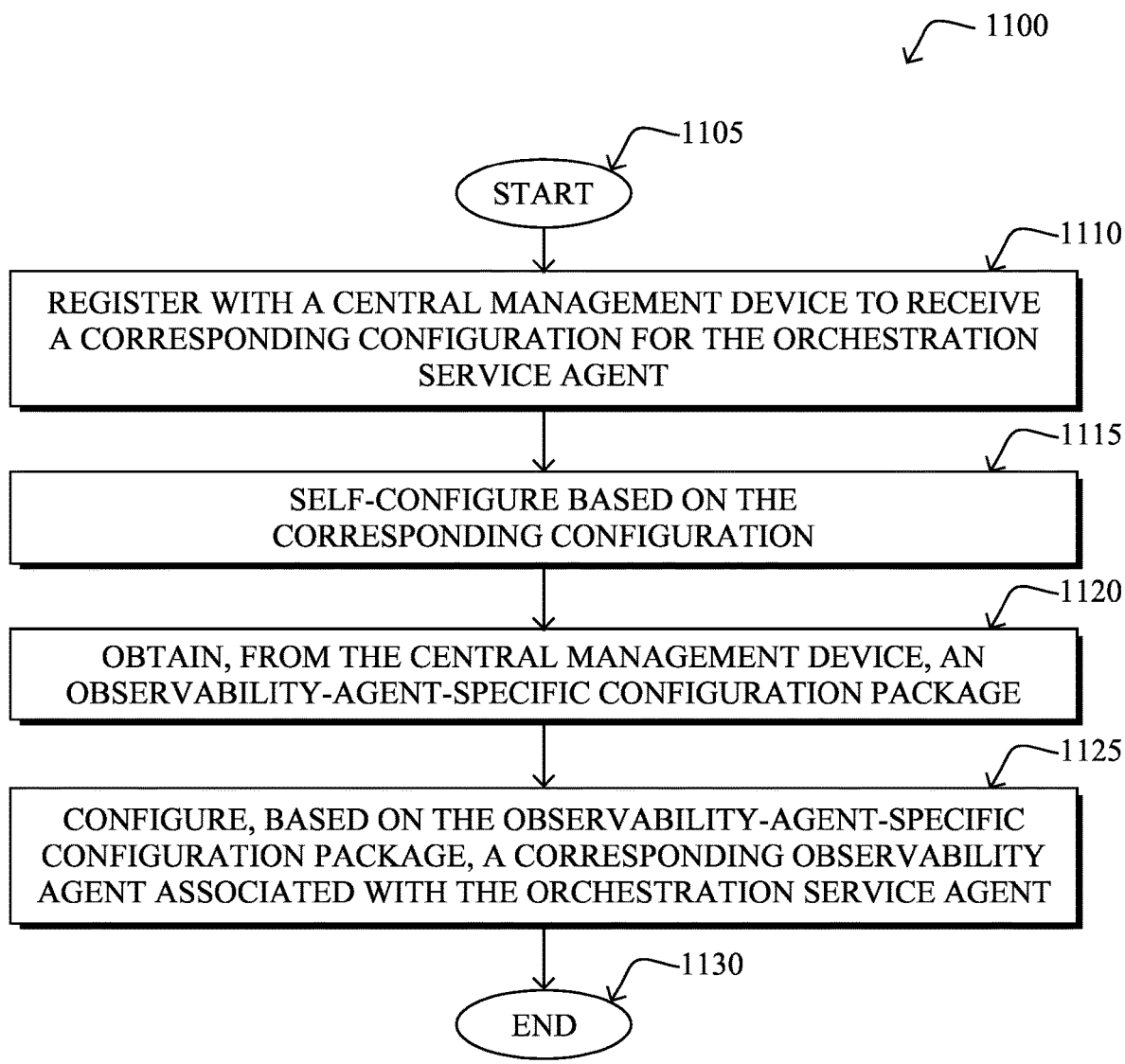
Figure 12:
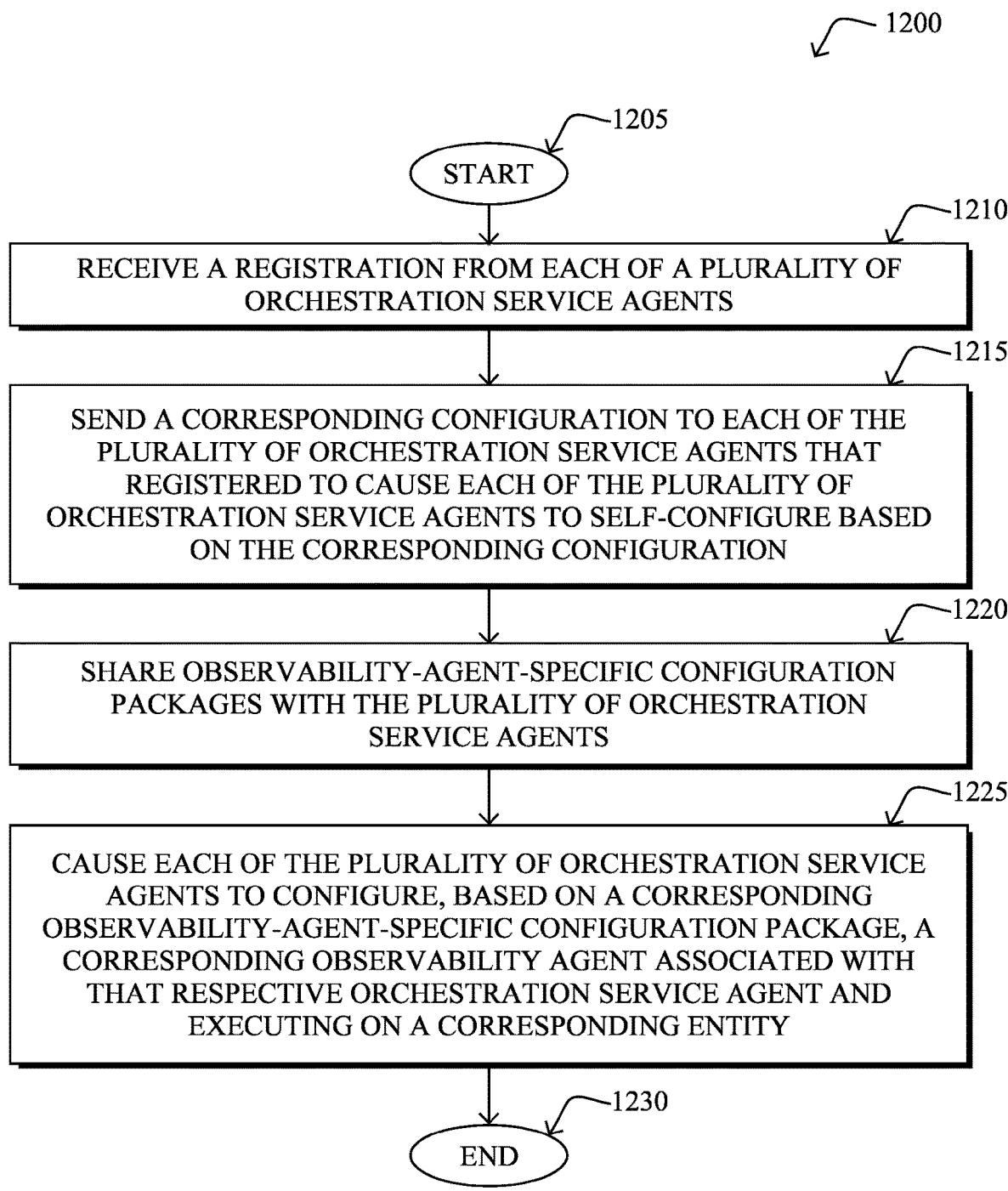

The embodiments herein may be better understood by referring to the following description in conjunction with the accompanying drawings in which like reference numerals indicate identically or functionally similar elements, of which:

FIG. 1 illustrates an example computer network;
FIG. 2 illustrates an example computing device/node;
FIG. 3 illustrates an example observability intelligence platform;
FIG. 4 illustrates an example architecture for smart agents ("orchestration service agents") according to one or more embodiments of the techniques herein;
FIG. 5 illustrates an example coding for a Packages Available message according to one or more embodiments of the techniques herein;
FIG. 6 illustrates an example coding for Package status according to one or more embodiments of the techniques herein;
FIG. 7 illustrates an example deployment file schema according to one or more embodiments of the techniques herein;
FIG. 8 illustrates an example deployment file;
FIG. 9 illustrates another example deployment file replacing variables of the file within FIG. 8 with placeholders according to one or more embodiments of the techniques herein;
FIG. 10 illustrates another example deployment file according to one or more embodiments of the techniques herein;
FIG. 11 illustrates an example simplified procedure for providing fleet management adapters for data collection agents according to one or more embodiments of the techniques herein, particularly from the perspective of an orchestration service agent; and
FIG. 12 illustrates an example simplified procedure for providing fleet management adapters for data collection agents according to one or more embodiments of the techniques herein, particularly from the perspective of a central management device.

DESCRIPTION OF EXAMPLE EMBODIMENTS

Overview

According to one or more embodiments of the disclosure, adapters are introduced that allow for the use of the emerging Open Agent Management Protocol (OpAMP) Open Telemetry standard with off-the-shelf solutions. This allows the use of OpAMP as a delivery mechanism into cloud native applications leveraging Open Telemetry.

In particular, in one embodiment, an illustrative method according to the techniques herein may comprise: registering, by an orchestration service agent, with a central management device to receive a corresponding configuration for the orchestration service agent, wherein the central management device receives a registration from each of a plurality of orchestration service agents; self-configuring, by the orchestration service agent, based on the corresponding configuration; obtaining, by the orchestration service agent and from the central management device, an observability-agent-specific configuration package; and configuring, by the orchestration service agent and based on the observability-agent-specific configuration package, a corresponding observability agent associated with the orchestration service agent and executing on a corresponding entity.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system (computing system 100) illustratively comprising any number of client devices (e.g., client devices 102, such as a first through nth client device), one or more servers (servers 104), and one or more databases (databases 106), where the devices may be in communication with one another via any number of networks (network(s) 110). The one or more networks may include, as would be appreciated, any number of specialized networking devices such as routers, switches, access points, etc., interconnected via wired and/or wireless connections. For example, devices (client devices 102, servers 104, etc.) and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

FIG. 2 is a schematic block diagram of an example node/device 200 that may be used with one or more embodiments described herein, e.g., as any of the devices (e.g., client devices 102, servers 104, databases 106, etc.) shown in FIG. 1 above. Device 200 may comprise one or more network interfaces (interfaces 210) (e.g., wired, wireless, etc.), at least one processor (processor 220), and a memory 240 interconnected by a system bus 250, as well as a power supply 260 (e.g., battery, plug-in, etc.).

The network interface(s) (interfaces 210) contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes (functional processes 246), and on certain devices, an illustrative "fleet management adapter process 248", as described herein. Notably, functional processes 246, when executed by processor 220 (or processors), cause each particular device (device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (agents 310) and one or more servers/controllers (controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 (or controllers) as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) (interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controllers receive data from different agents (e.g., agents 310, such as Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Fleet Management Adapters for Data Collection Agents—

As noted above, the OpenTelemetry (OTEL) standard unifies telemetry data in a vendor-agnostic manner. However, deploying multi-vendor agents to monitor a single system adds the challenge of managing the fleet of agents in a unified manner. The Open Agent Management Protocol (OpAMP) is a network protocol for the remote management of a large fleet of data collection agents where each vendor can use its own management approach for its own agent. Today, OpAMP supports functions such as the remote configuration of agents, status reporting, agent specific metrics, auto-updating, and the like.

As also noted above, optimal fleet management strategies entail using OpAMP as a delivery mechanism into a cloud native application leveraging OTEL, while using proven and flexible configuration and deployment tools locally to actually manage the process. Unfortunately, adapters for OpAMP to do so are not yet available to use these tools.

The techniques herein, therefore, introduce such adapters that allow for the use of the emerging OpAMP Open Telemetry standard with off-the-shelf solutions (such as, e.g., Helms Chart, Ansible, and the like). This allows the use of OpAMP as a delivery mechanism into cloud native applications leveraging Open Telemetry using these proven technologies.

Specifically, as described in greater detail below, an illustrative method herein may comprise: registering, by an orchestration service agent, with a central management device to receive a corresponding configuration for the orchestration service agent, wherein the central management device receives a registration from each of a plurality of orchestration service agents; self-configuring, by the orchestration service agent, based on the corresponding configuration; obtaining, by the orchestration service agent and from the central management device, an observability-agent-specific configuration package; and configuring, by the orchestration service agent and based on the observability-agent-specific configuration package, a corresponding observability agent associated with the orchestration service agent and executing on a corresponding entity.

As a brief overview, the Open Agent Management Protocol (OpAMP) is a network protocol for remote management of large fleets of data collection agents. OpAMP allows agents to report their status to and receive configuration from a server and to receive agent installation package updates from the server. The protocol is vendor-agnostic, so the server can remotely monitor and manage a fleet of different agents that implement OpAMP, including a fleet of mixed agents from different vendors.

Currently, OpAMP supports the following functionalities:

Remote configuration of the agents;

Status reporting. The protocol allows the agent to report the properties of the agent such as its type and version or the operating system type and version it runs on. The status reporting also allows the management server to tailor the remote configuration to individual agents or types of agents;

Agent's own telemetry reporting to an OTLP-compatible backend to monitor Agent's process metrics such as CPU or RAM usage, as well as agent-specific metrics such as rate of data processing;

Management of downloadable agent-specific packages;

Secure auto-updating capabilities (both upgrading and downgrading of the agents); and Connection credentials management, including client-side TLS certificate revocation and rotation.

The functionality listed above enables a 'single pane of glass' management view of a large fleet of mixed agents (e.g., OpenTelemetry Collector, Fluentd, etc.).

Regarding client/server communications and architecture, the OpAMP server manages agents that provide a client-side implementation of OpAMP protocol, further referred to as OpAMP client or simply client. OpAMP does not assume any particular relationship between the agent and the client. The client can be run as a separate process with a different lifecycle than the agent, a sidecar, a plugin, or be fully integrated into the agent code.

The OpAMP protocol works over one of the two supported transports: plain HTTP connections and WebSocket connections. The default URL path for the connection is /v1/OpAMP. The URL path may be configurable on the client and on the server.

One of the typical ways to implement OpAMP on the agent side is by having a helping supervisor process, which controls the agent process. The supervisor is also typically responsible for communicating with the OpAMP Server.

The second supported transport for OpAMP protocol is plain HTTP connection. The OpAMP client is an HTTP client and the server is an HTTP server. The client makes POST requests to the server. The body of the POST request and response is a binary serialized Protobuf message. The client sends AgentToServer Protobuf messages in the request body and the server sends ServerToAgent Protobuf messages in the response body.

Generally, OpAMP over HTTP is a synchronous, half-duplex message exchange protocol. The client initiates an HTTP request when it has an AgentToServer message to deliver. The server responds to each HTTP request with a ServerToAgent message it wants to deliver to the agent. If the agent has nothing to deliver to the server, the client periodically polls the server by sending an AgentToServer message where only instance_uid field is set. This gives the server an opportunity to send back in the response any messages that the server wants to deliver to the agent (such as for example a new remote configuration).

The default polling interval when the agent does not have anything to deliver is 30 seconds. This polling interval should be configurable on the client.

When using HTTP transport the sequence of messages is exactly the same as it is when using the WebSocket transport. The only difference is in the timing:

When the server wants to send a message to the agent, the server needs to wait for the client to poll the server and establish an HTTP request over which the server's message can be sent back as an HTTP response;

When the agent wants to send a message to the server and the agent has previously sent a request to the server that is not yet responded, the client waits until the response is received before a new request can be made. Note that the new request in this case can be made immediately after the previous response is received, the client does not need to wait for the polling period between requests.

The client sets a "Content-Type: application/x-protobuf" request header when using plain HTTP transport. When the server receives an HTTP request with this header set it should assume this is a plain HTTP transport request, otherwise it should assume this is a WebSocket transport initiation.

The Client may compress the request body using gzip method and then specifies "Content-Encoding: gzip" in that case. Server implementations honor the "Content-Encoding" header and support gzipped or uncompressed request bodies. The server should compress the response if the client indicated it can accept compressed response via the "Accept-Encoding" header.

OpAMP operation and configuration may be further understood with reference to the Open Agent Management Protocol provided by OpenTelemetry, currently located at the following URL: https://opentelemetry.io/docs/specs/opamp/.

As noted above, the present disclosure relates specifically to fleet management adapters for data collection agents. Specifically, part of the fleet management strategy and architecture herein is using OpAMP as a delivery mechanism into cloud native applications leveraging Open Telemetry technology, but ultimately using proven and flexible configuration and deployment tools locally to actually manage the process. In particular, "Fleet Management" herein is a system that comprises "smart agents" managed by a fleet management server, where each smart agent is capable of managing a particular entity (e.g., a Kubernetes, "K8s", cluster). As described in greater detail below, the system operates on top of OTEL OpAMP, and smart agents invoke "Adapters", which in turn invoke the cloud native applications (e.g., Helm Charts/Ansible/etc.).

Operationally, the techniques herein thus build an "adapter" system such as the following:

OpAMP Server→InternetOpAMP ClientOpAMP TO Master AdapterIndividual Adapters: (ServerToAgent Commands, AgentToServer Responses, etc.—Configuration/etc.)

Helms Chart AdapterHelm Chart SystemKubernetes Deployment and Configuration

Ansible AdapterAnsible SystemApplication Deployments and Configuration

Other AdaptersOther SystemInfrastructure/etc. Deployments and Configuration

OpAMP Server←Internet←OpAMP Client←OpAMP TO Master Adapter←Individual Adapters: (AgentToServer Commands, AgentToServer Responses, Configuration/etc. success)

Helms Chart Adapter←Helm Chart System←Kubernetes Deployment and Configuration

Ansible Adapter←Ansible System←Application Deployments and Configuration

Other Adapter←Other System←Infrastructure/etc. Deployments and Configuration

Notably, the fleet management adapters herein uniquely "bind" together an OTEL Standard for Management (OpAMP) with standards for managing cloud native applications (e.g., Helm, Ansible, Terraform, etc.) by using these adapters to perform "translation" and "abstract" the technology differences.

As an example, assume Helm Charts is used in an Amazon Web Services (AWS) OTEL environment. As will be appreciated by those skilled in the art, this is a localized (i.e., AWS proprietary) solution, which does not take advantage of OpAMP remote management and other capabilities. While this is common for cloud vendors, customers would embrace an OTEL management standard that is cloud vendor neutral and has the ability to use vendor neutral proven open source standard configuration/deployment mechanisms, as provided by the adapter technology described herein.

According to the techniques herein, deployment and configuration stages are illustratively done separately, in a two-step process. First, the OpAMP client (a "super agent" or "smart agent" herein) will start up the deployments (containers, etc.) and then follow up with the configuration. The deployment itself is done via the use of the adapters (e.g., for Helm, Ansible, etc.). However, the configuration may use a pre-existing "Package Manager" system built into OpAMP which essentially does the following:

Lists available packages on the server;
Specifies which packages to install from the client;
Downloads the packages to a location on the file system; and
Installs packages from the file system.

FIG. 4 illustrates an example architecture 400 for smart agents herein. As shown, an illustrative "Fleet Management" (FM) server (fleet management server 410) which may be composed of a cloud-based software as a service (CSaaS) controller UI 412 on top of an associated OpAMP server (OpAMP server 414) communicate with orchestration service 420 (a.k.a. "super agent" or "smart agent"), particularly via OpAMP client 422. A process watcher 424 discovers and maintains processes, in reporting collaboration with the OpAMP client 422. The OpAMP client 422 manages various plugins 430, such as an id_preload.so plugin 432, an APM (e.g., AppDynamics) agents collection plugin 434, and an agent installer 438 (e.g., Ansible Python API), which may be in collaboration with a command line interface (CLI) 436, and a Python thin client 439, as may be appreciated by those skilled in the art. As shown, calls are made between the agent installer 438 and the interprocess process stub 426 of the super agent/orchestration service 420, which communicates accordingly with the OpAMP client 422.

Regarding interactions in accordance with OpAMP, there are mainly four interactions between the fleet management server 410 and smart agent OpAMP client 422: registration; smart agent configuration management; packages (APM agents installation/upgrades/decommission) management; and telemetry.

For registration, when the OpAMP client first starts up, it registers itself with the OpAMP server 414 through an AgentToServer message. The server will then contain a registry of all the OpAMP clients registered against it.

Configuration management is where the server relays the configuration through the ServerToAgent message to the desired smart agent. The smart agent will apply the configuration and report back the status via AgentToServer message specifically through a RemoteConfigStatus field. The smart agent can support restarts of itself if desired by the FM service—if indicated through the command field in ServerToAgent message. (Note that the configuration in this context is the configuration of smart agent but not the packages (agents) the smart agent manages. The details are handled using packages provisioning in the protocol, described below.)

In terms of package (agent deployment) management, the smart agent effectively takes a deployment spec objects (e.g., ansible playbook/helm, etc.) from the FM service and executes them to install the agents on the machine (e.g., a cluster in the case of Kubernetes, "K8s") where it is running. In that sense, these deployment files can be treated as add-ons or packages in OpAMP semantics. Any new modifications are treated as a new version of these add-ons, which results in "updates" for the agents.

Using the above reasoning to treat these deployment objects (e.g., ansible plays or k8s helm charts, etc.) as add-ons and combining with the OpAMP specification, the techniques herein derive the following interaction flow:

FM service creates a new deployment object from the user input (while install/upgrade/uninstall/modify-configuration of an agent).

FM service serves this deployment object (helm chart/ ansible play) at a URL that can be accessed by the smart agent;

This (URL+QUERY PARAMETERS) should be unique per each deployment file;

These deployment objects can be versioned.

FM service fills in the PackagesAvailable in the 'ServerToAgent' message for each deployment object with the following details:

package name (must be unique and set to installation identifier, and can support multiple installations of the same package type—in different locations, for example, different names will be given to java agents playbook yamls that are desired to be installed in two different locations);

package type (set to PackageType_Addon);

Download details (e.g., the download url of the deployment file, the content hash of the file, and an optional signature).

The smart agent processes the message as follows:

Checks if the hash of the deployment file it has locally is different from what server has;

downloads the file from server's said location; and applies the file deployment.

The smart agent reports the package installation details in PackageStatuses field in AgentToServer message. This message is a collection of individual package statuses. All the fields as described in PackageStatus field are set by a smart agent for each package.

FIG. 5 illustrates an example coding 500 for a Packages Available message, while FIG. 6 illustrates an example coding 600 for Package Status.

Notably, an alternative embodiment herein to manage the deployment is to treat the deployment objects as configuration of smart agent itself. However, while this model seems straight-forward, the following reasoning is behind why modeling deployment objects as packages make more sense. Firstly, deployment objects (Ansible playbooks/Helm configuration, etc.) are not part of smart agent and technically their context is independent of smart agent, thus they cannot be treated as smart agents own configuration. Also, treating deployment objects as packages opens up possibility to support versioning (e.g., a server can store multiple versions of each deployment object, and the techniques herein can leverage version fields and support switching between versions from UI). Moreover, packages also provide a soft-way to deal with brown field deployment, especially when the techniques herein can perform auto discovery of already installed agents, packages message from smart agent can report already installed package details. Furthermore, and importantly, packages are a way to ensure consistency between server and smart machine. By using hash provided by the server the smart agent always converges the installation to state which produces same hash. Any changes (accidental or not) done locally are re-consolidated to the expected state from server. This is done since a hash differs between server and client for a given package. With packages, the design adheres to the specification as opposed to configuration where one would need to define custom schemas for configuration objects, error messages, etc. to distinguish smart agent configuration and packages deployment configurations.

Although OpAMP provides almost complete definitions for various messages, the specification leaves out the schema definitions for configurations, error messages, and package urls to the implementations. As such, the below are the schemas of such objects defined for the specific use cases herein:

Package URL-URL-based path including versioning of the service/v1, where the details to identify individual deployment files are included as query parameters (e.g., ?version=1&&deployment_id=java-agentuid1). Note that the schema for content of the deployment package served must facilitate multiple deployment technologies. FIG. 7 illustrates an example deployment file schema 700.

Package Status Messages—Although OpAMP provides a PackageStatuses field to describe the state of installed packages (deployment), additional details specific to deployment are needed to establish associations in the backend. Since there is no explicit field defined in the specification at this time, the techniques herein may use an error_message field to send the information. Note that error_message should be treated as status_message when status=PackageStatusEnum_Installed is set in PackageStatuses field. Also, the error_message may be a serialized json string with the following schema:

```
error_message: {
  "app":
  "tier":
  "node":
  "agent_type":
  "agent_action":
  "status":
  "arch":
  "installation_path":
}
```

In the case of an error, a message that captures the failure may then be sent:

```
error_message = {
  "agent_type":
  "agent_action":
  "status":
  "arch":
```

```
  "installation_path":
  "failure_msg":
}
```

Regarding telemetry, smart agents can use OpAMP provisions to report its own metrics and logs (runtime logs), while any errors that happen while applying the smart agent's own configuration can be sent via 'error_message' field of RemoteConfigStatus. Packages, on the other hand, can use a Package Status field of OpAMP to describe the errors that happened while deploying the agents. The same error_message may be retrofitted to pass on the summary of the installation (Like App/Tier/Node name configured, etc.) in case of successful installation as well. Lastly, agents can report telemetry independently of OpAMP channels, and agent logs are written to a local file system, and so forth.

With the above understanding of smart agents (OpAMP clients/super agents), the present disclosure now describes example adapters for specific implementations in accordance with one or more embodiments of the techniques described herein.

First, a Helms Chart Adapter is described for Kubernetes cluster management. In particular, Helm is an open-source project which was originally created by DesiLabs and donated to CNCF, which now maintains it. The original goal of Helm was to provide users with a better way to manage all the Kubernetes YAML files created on Kubernetes projects. The path Helm took to solve this issue was to create "Helm Charts". Each chart is a bundle with one or more Kubernetes manifests-a chart can have child charts and dependent charts as well.

This means that Helm installs the whole dependency tree of a project if the install command is run for the top-level chart. That is, there is just a single command to install an entire application, instead of listing the files to install via kubectl, as will be appreciated by those skilled in the art.

Charts allow for versioning of manifest files as well, similar to Node.js or any other package. This allows for the installation of specific chart versions, which means keeping specific configurations for certain infrastructures in the form of code. Helm also keeps a release history of all deployed charts, allowing for backtracking to a previous release if something went wrong. Helm also supports Kubernetes natively, which means there is no need to write any complex syntax files or anything to start using Helm. That is, programmers can simply place their template files into a new chart.

Helm is particularly useful to provide functionality that Kubernetes does not provide, such as templating. That is, the scope of Kubernetes is to manage containers, not template files. This makes it overly difficult to create truly generic files to be used across a large team or a large organization with many different parameters that need to be set for each file. Moreover, it leaves out the capability to version sensitive information using Git when template files are plain text.

Helm addresses the above concerns using "Go templates", which provide access to data objects and additional functions that are passed into a template engine programmatically, as may be appreciated by those skilled in the art. Helm allows programmers to add variables and use functions inside their template files. This makes it well suited for scalable applications that will eventually need to have their parameters changed.

Assume the following example of an open-source project called "Zaqar", a simple email microservice for Node.js which communicates with SendGrid. The project is basically composed of a service, a deployment, and an autoscaler. FIG. 8 illustrates an example deployment file 800 for this situation. If this template were to be used on a continuous integration (CI) pipeline, or if it were to be published on GitHub, the variable parts would need to be replaced with placeholders. As such, the techniques herein can replace these texts with the required information.

In this case, both the version tag, the env label, and the environment variables would be replaced by placeholders, such as shown in FIG. 9 in the example updated deployment file 900. Now, the CI pipeline can be run. However, before that is performed, the techniques herein may replace the placeholders with the actual values. For this, one example is to use "sed" and its simple syntax:

"sed 's/#!PLACEHOLDER!#/replacement/g';

which can be propagated until replacing all the placeholders. The final command would be something like this:

```
cat deploy.yaml | \
    sed 's/#!ENV!#/production/g' | \
    sed 's/#!VERSION!#/v1.0.0/g' | \
    sed 's/#!SENDGRID_KEY!#/MyKey/g' | \
    sed 's/#!FROM_ADDR!#/my@email.com/g' | \
    sed 's/#!FROM_NAME!#/Lucas Santos/g'
```

By default, sed outputs everything to the stdout, so another pipe can be added to kubectl -f, such as <all the command from before> |kubectl-f-. Then there will be a customized deployment in place. The only problem is that the same thing needs to be done for all the other files.

Now assume a larger project, with lots of other variables and placeholders.

Generally, most programmers would choose to write a script to do these tasks. That script is Helm. When creating a Chart (more on this below), there is a specific directory tree that must be followed so Helm understands the programmer's intentions. As such, inside the templates directory, custom manifest files can be added, with native go templating, such as shown in deployment file 1000 of FIG. 10.

Here, all the values can be obtained from a Values.yaml file (for default values), or they can be set up in a CLI using the—set<path> value flag. For instance, to install a custom chart, the following command can be issued:

```
helm upgrade --install --create-namespace myChart ./path/to/my/chart \
    --set image.tag=v1.0.0 \
    --set env=production \
    --set environment.SENDGRID_APIKEY=myKey \
    --set environment.DEFAULT_FROM_ADDRESS="my@email.com" \
    --set environment.DEFAULT_FROM_NAME="Lucas Santos"
```

Helm also allows the use of functions inside custom deployments. As such, there can be default functions to fallback to default values if they are not filled, such as the namespace. Alternatively, a requirement could be enforced where a message is displayed and the chart fails to install if the value is not provided, which is the case of the environment variables above.

Accordingly, systems herein can efficiently manage application resources, but can also publish these resources in an open-source version system without any hassle or security issue.

Note, too, that there are many other useful functions in Helm, and those listed above are merely examples of what tools may be exposed through the use of adapters herein.

As mentioned above, to create a Helm Chart, with Helm installed a programmer can simply type in "create<chart name>" and it will create a directory filled with files and other directories. Those files are required for Helm to create a chart. The below is a simplified example of what this file tree looks like and what the files are within it:

chart.yaml: This is where information related to the chart is kept. That includes the chart version, name, and description so it can be located if published on an open repository. Also in this file is the ability to set external dependencies using the dependencies key.

values.yaml: Like above, this is the file that contains defaults for variables.

templates (dir): This is where all manifest files are placed. Everything in here will be passed on and created in Kubernetes.

charts: If a chart depends on another chart (e.g., another custom chart), or if the programmer does not want to rely on Helm's default library (the default registry where Helm pull charts from), this same structure can be brought inside this directory. Chart dependencies are installed from the bottom to the top, which means if chart A depends on chart B, and B depends on C, the installation order will be C→B→A.

Notably, once a chart is created, there is no need to download the entire repository to install those charts, as Helm has a public library for the most-used charts. Custom chart repository can also be created and hosted online. Helm can also access other repositories (e.g., HomeBrew, or Linux) to download charts contained in them. (Since a chart repository is basically an index.yaml file served from a static web server, chart repositories can essentially be created out of anywhere.)

Second, an Ansible Adapter is described for configuration management and automation of application deployment. In particular, Ansible is a modern configuration management tool that facilitates the task of setting up and maintaining remote servers, with a minimalist design intended to get users up and running quickly. Users write Ansible provisioning scripts in YAML, a user-friendly data serialization standard that is not tied to any particular programming language. This enables users to create sophisticated provisioning scripts more intuitively compared to similar tools in the same category.

Ansible doesn't require any special software to be installed on the nodes that will be managed with this tool. A control machine is set up with the Ansible software, which then communicates with the nodes via standard SSH.

As a configuration management tool and automation framework, Ansible encapsulates all of the common features present in other tools of the same category, while still maintaining a strong focus on simplicity and performance. When writing Ansible automation scripts, you can use variables, conditionals, and loops in order to make your automation more versatile and efficient. Ansible also collects a series of detailed information about the managed nodes, such as network interfaces and operating system, and provides it as global variables called system facts. Facts can be used within playbooks to make your automation more versatile and adaptive, behaving differently depending on the system being provisioned.

Ansible also uses the Jinja2 Python templating system to allow for dynamic expressions and access to variables. Templates can be used to facilitate setting up configuration files and services. For instance, a template can be used to set up a new virtual host within Apache, while reusing the same template for multiple server installations.

According to the components/concepts of Ansible, a "control node" is a system where Ansible is installed and set up to connect to a custom server. There can be multiple control nodes, and any system capable of running Ansible can be set up as a control node, including personal computers or laptops running a Linux or Unix based operating system. For the time being, Ansible can't be installed on Windows hosts, but this limitation can be circumvented by setting up a virtual machine that runs Linux and running Ansible from there.

The systems controlled using Ansible are called "managed nodes". Ansible requires that managed nodes are reachable via SSH, and have Python 2 (version 2.6 or higher) or Python 3 (version 3.5 or higher) installed. Ansible supports a variety of operating systems including Windows servers as managed nodes.

An "inventory file" contains a list of the hosts that will be managed using Ansible. Although Ansible typically creates a default inventory file when it is installed, per-project inventories can be used to have a better separation of an infrastructure and avoid running commands or playbooks on the wrong server by mistake. Static inventories are usually created as .ini files, but dynamically generated inventories written in any programming language able to return JSON can also be used.

In Ansible, a "task" is an individual unit of work to execute on a managed node. Each action to perform is defined as a task. Tasks can be executed as a one-off action via ad-hoc commands, or included in a playbook as part of an automation script.

A "playbook" contains an ordered list of tasks, and a few other directives to indicate which hosts are the target of that automation, whether or not to use a privilege escalation system to run those tasks, and optional sections to define variables or include files. Ansible executes tasks sequentially, and a full playbook execution is called a play. Playbooks are written in YAML format.

"Handlers" are used to perform actions on a service, such as restarting or stopping a service that is actively running on the managed node's system. Handlers are typically triggered by tasks, and their execution happens at the end of a play, after all tasks are finished. This way, if more than one task triggers a restart to a service, for instance, the service will only be restarted once and after all tasks are executed. Although the default handler behavior is more efficient and is overall a better practice, it is also possible to force immediate handler execution if that is required by a task.

A "role" is a set of playbooks and related files organized into a predefined structure that is known by Ansible. Roles facilitate reusing and repurposing playbooks into shareable packages of granular automation for specific goals, such as installing a web server, installing a PHP environment, or setting up a MySQL server.

While the techniques herein have primarily focused on Helm and Ansible adapters as examples, other potential adapters may be established based on the techniques herein, such as for Chef, Puppet, Terraform, etc.

For instance, Chef is an open source configuration management tool developed by Opscode. Chef is available for free, but there are paid versions, such as Chef Enterprise. Chef is written in Ruby and Erlang, and offers a means of defining infrastructure as code that can be deployed onto multiple servers, which also includes automatic configuration and maintenance.

When using Puppet, users define the desired state of the systems in an infrastructure that is to be managed. This can be accomplished by writing infrastructure code in Puppet's Domain-Specific Language (DSL)—"Puppet Code"— which can be used with a wide array of devices and operating systems. Puppet code is declarative, which means the desired state of systems is described, not the steps needed to get there. Puppet then automates the process of getting these systems into that state and keeping them there. Puppet does this through a Puppet primary server and a Puppet agent. The Puppet primary server is the server that stores the code that defines the desired state. The Puppet agent translates code into commands and then executes it on the systems custom specified, in what is called a "Puppet run".

For Terraform, Infrastructure-as-Code (IaC) is a practice that has become mainstream with the growing popularity of public cloud providers, such as AWS, Google, and Microsoft. It consists of managing a set of resources (computing, network, storage, etc.) using the same approach developers use to manage application code. Terraform allows programmers to declare what their infrastructure should look like, and the tool will decide which actions must be taken to "materialize" that infrastructure.

In closing, FIG. 11 illustrates an example simplified procedure (procedure 1100) for providing fleet management adapters for data collection agents according to one or more embodiments of the techniques herein, particularly from the perspective of an "orchestration service agent" (e.g., an adapter/super agent, or orchestration service 420 above). For example, a non-generic, specifically configured device (e.g., device 200, an apparatus) may perform procedure 1100 by executing stored instructions (e.g., the fleet management adapter process 248, on an orchestration service agent). The procedure 1100 may start at step 1105, and continues to step 1110, where, as described in greater detail above, an orchestration service agent registers with a central management device (e.g., fleet management server 410) to receive a corresponding configuration for the orchestration service agent. In step 1115, the orchestration service agent self-configures based on the corresponding configuration. Notably, the central management device receives a registration from each of a plurality of orchestration service agents, and in one implementation, each of the plurality of orchestration service agents corresponds to a single respective observability agent.

In step 1120, the orchestration service agent obtains, from the central management device, an observability-agent-specific configuration package. In one implementation, the observability-agent-specific configuration package is based on command line interface input (e.g., user input). In another implementation, the observability-agent-specific configuration package comprises an ordered grouping of tasks to perform (e.g., Helm charts, Ansible playbooks/plays, etc.).

Note that in one embodiment, the orchestration service agent may receive (e.g., from the central management device) information regarding one or more available observability-agent-specific configuration packages and how to obtain the one or more available observability-agent-specific configuration packages. Also, in another embodiment, the orchestration service agent may access a uniform resource locator (URL) for the observability-agent-specific configuration package. In particular, each of a plurality of unique URLs may correspond to a unique observability-agent-specific configuration package, such that the orchestration service agent may then select a specific URL from the plurality of unique uniform resource locators to access for the observability-agent-specific configuration package, accordingly.

In step 1125, the orchestration service agent may then configure, based on the observability-agent-specific configuration package, a corresponding observability agent associated with the orchestration service agent and executing on a corresponding entity (e.g., a cluster of a container orchestration system, such as a K8s cluster). For example, configuring the corresponding observability agent comprises one or more of: installing the corresponding observability agent on the corresponding entity; modifying behavior of the corresponding observability agent; upgrading the corresponding observability agent; or decommissioning the corresponding observability agent. Also, as described in greater detail above, the observability-agent-specific configuration package may comprise one or more updates for one or more placeholder values within a prior template-based configuration of the corresponding observability agent. In still another embodiment, as detailed above, configuring the corresponding observability agent may comprise causing the corresponding observability agent to store a plurality of versioned observability-agent-specific configuration packages; and informing the corresponding observability agent which particular versioned observability-agent-specific configuration package of the plurality of versioned observability-agent-specific configuration packages to use.

The procedure may then end at step 1130. The orchestration service agent may be further configured to perform additional steps not shown above as well, such as reporting telemetry data based on the orchestration service agent (where the corresponding observability agent reports their own telemetry data based on the corresponding observability agent), reporting, to the central management device, a status of configuration of the observability-agent-specific configuration package on the corresponding observability agent (e.g., within an error message field of an agent management protocol), and so on.

In addition, FIG. 12 illustrates an example simplified procedure (procedure 1200) for providing fleet management adapters for data collection agents according to one or more embodiments of the techniques herein, particularly from the perspective of a "central management device" (e.g., a fleet management server 410). For example, a non-generic, specifically configured device (e.g., device 200, an apparatus) may perform procedure 1200 by executing stored instructions (e.g., the fleet management adapter process 248, on a central management device). The procedure 1200 may start at step 1205, and continues to step 1210, where, as described in greater detail above, a central management device receives a registration from each of a plurality of orchestration service agents. In step 1215, the central management device sends a corresponding configuration to each of the plurality of orchestration service agents that registered to cause each of the plurality of orchestration service agents to self-configure based on the corresponding configuration. In step 1220, the central management device may then share observability-agent-specific configuration packages with the plurality of orchestration service agents to cause, in step 1225, each of the plurality of orchestration service agents to configure, based on a corresponding observability-agent-specific configuration package, a corresponding observability agent associated with that respective orchestration service agent and executing on a corresponding entity.

The procedure may then end at step 1230.

It should be noted that while certain steps within the procedures above may be optional as described above, the steps shown above are merely examples for illustration, and certain other steps may be included or excluded as desired. Further, while a particular order of the steps is shown, this ordering is merely illustrative, and any suitable arrangement of the steps may be utilized without departing from the scope of the implementations herein.

In some implementations, an apparatus comprises one or more network interfaces to communicate with a network, a processor coupled to the one or more network interfaces and configured to execute one or more processes, and a memory configured to store a process that is executable by the processor. In such implementations, the process, when executed, may be configured to: register, as an orchestration service agent, with a central management device to receive a corresponding configuration for the orchestration service agent, wherein the central management device receives a registration from each of a plurality of orchestration service agents; self-configure operation of the orchestration service agent based on the corresponding configuration; obtain, from the central management device, an observability-agent-specific configuration package; and configure, based on the observability-agent-specific configuration package, a corresponding observability agent associated with the orchestration service agent and executing on a corresponding entity.

In still other implementations, a tangible, non-transitory, computer-readable medium can have computer-executable instructions stored thereon that, when executed by a processor on a computer, cause the computer to perform a method comprising: registering, as an orchestration service agent, with a central management device to receive a corresponding configuration for the orchestration service agent, wherein the central management device receives a registration from each of a plurality of orchestration service agents; self-configuring operation of the orchestration service agent based on the corresponding configuration; obtaining, from the central management device, an observability-agent-specific configuration package; and configuring, based on the observability-agent-specific configuration package, a corresponding observability agent associated with the orchestration service agent and executing on a corresponding entity.

The techniques herein, therefore, provide for fleet management adapters for data collection agents. In particular, the techniques herein allow for the use of the OpAMP Open Telemetry standard with off-the-shelf solutions, thereby allowing the use of OpAMP as a delivery mechanism into cloud native applications leveraging Open Telemetry, accordingly.

Illustratively, the techniques described herein may be performed by hardware, software, and/or firmware, such as in accordance with the fleet management adapter process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the fleet management adapter process 248.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
registering, by an orchestration service agent, with a central management device to receive a corresponding configuration for the orchestration service agent, wherein the central management device receives a registration from each of a plurality of orchestration service agents;
self-configuring, by the orchestration service agent, based on the corresponding configuration;
obtaining, by the orchestration service agent and from the central management device, an observability-agent-specific configuration package; and
configuring, by the orchestration service agent and based on the observability-agent-specific configuration package, a corresponding observability agent associated with the orchestration service agent and executing on a corresponding entity.

2. The method as in claim 1, wherein obtaining comprises:
accessing a uniform resource locator for the observability-agent-specific configuration package.

3. The method as in claim 2, wherein each of a plurality of unique uniform resource locators corresponds to a unique observability-agent-specific configuration package, the method further comprising:
selecting a specific uniform resource locator from the plurality of unique uniform resource locators to access for the observability-agent-specific configuration package.

4. The method as in claim 1, wherein configuring the corresponding observability agent comprises one or more of: installing the corresponding observability agent on the corresponding entity; modifying behavior of the corresponding observability agent; upgrading the corresponding observability agent; or decommissioning the corresponding observability agent.

5. The method as in claim 1, wherein each of the plurality of orchestration service agents corresponds to a single respective observability agent.

6. The method as in claim 1, further comprising:
reporting first telemetry data based on the orchestration service agent, wherein the corresponding observability agent reports second telemetry data based on the corresponding observability agent.

7. The method as in claim 1, wherein the observability-agent-specific configuration package comprises one or more updates for one or more placeholder values within a prior template-based configuration of the corresponding observability agent.

8. The method as in claim 1, further comprising:
receiving, from the central management device, information regarding one or more available observability-agent-specific configuration packages and how to obtain the one or more available observability-agent-specific configuration packages.

9. The method as in claim 1, wherein configuring the corresponding observability agent comprises:
causing the corresponding observability agent to store a plurality of versioned observability-agent-specific configuration packages; and
informing the corresponding observability agent which particular versioned observability-agent-specific configuration package of the plurality of versioned observability-agent-specific configuration packages to use.

10. The method as in claim 1, wherein the corresponding entity comprises a cluster of a container orchestration system.

11. The method as in claim 1, wherein the observability-agent-specific configuration package is based on command line interface input.

12. The method as in claim 1, wherein the observability-agent-specific configuration package comprises an ordered grouping of tasks to perform.

13. The method as in claim 1, further comprising:
reporting, to the central management device, a status of configuration of the observability-agent-specific configuration package on the corresponding observability agent within an error message field of an agent management protocol.

14. An apparatus, comprising:
one or more network interfaces;
a processor coupled to the one or more network interfaces and configured to execute one or more processes; and
a memory configured to store a process that is executable by the processor, the process when executed configured to:
register, as an orchestration service agent, with a central management device to receive a corresponding configuration for the orchestration service agent, wherein the central management device receives a registration from each of a plurality of orchestration service agents;
self-configure operation of the orchestration service agent based on the corresponding configuration;
obtain, from the central management device, an observability-agent-specific configuration package; and
configure, based on the observability-agent-specific configuration package, a corresponding observability agent associated with the orchestration service agent and executing on a corresponding entity.

15. The apparatus as in claim 14, wherein the process when executed to configure the corresponding observability agent is configured to: install the corresponding observability agent on the corresponding entity; modify behavior of the corresponding observability agent; upgrade the corresponding observability agent; or decommission the corresponding observability agent.

16. The apparatus as in claim 14, wherein each of the plurality of orchestration service agents corresponds to a single respective observability agent.

17. The apparatus as in claim 14, wherein the process when executed is further configured to:
report first telemetry data based on the orchestration service agent, wherein the corresponding observability agent reports second telemetry data based on the corresponding observability agent.

18. The apparatus as in claim 14, wherein the observability-agent-specific configuration package comprises one or more updates for one or more placeholder values within a prior template-based configuration of the corresponding observability agent.

19. The apparatus as in claim 14, wherein the process when executed is further configured to:
receive, from the central management device, information regarding one or more available observability-agent-specific configuration packages and how to obtain the one or more available observability-agent-specific configuration packages.

20. A tangible, non-transitory, computer-readable medium having computer-executable instructions stored thereon that, when executed by a processor on a computer, cause the computer to perform a method comprising:
registering, as an orchestration service agent, with a central management device to receive a corresponding configuration for the orchestration service agent, wherein the central management device receives a registration from each of a plurality of orchestration service agents;
self-configuring operation of the orchestration service agent based on the corresponding configuration;
obtaining, from the central management device, an observability-agent-specific configuration package; and
configuring, based on the observability-agent-specific configuration package, a corresponding observability agent associated with the orchestration service agent and executing on a corresponding entity.

* * * * *